US010455430B2

(12) United States Patent
Wang et al.

(10) Patent No.: US 10,455,430 B2
(45) Date of Patent: Oct. 22, 2019

(54) PREDICTING WIRELESS ACCESS POINT AVAILABILITY

(71) Applicants: Hewlett Packard Enterprise Development LP, Houston, TX (US); Shuai Wang, Beijing (CN); Jun Qing Xie, Beijing (CN); Xiaofeng Yu, Beijing (CN)

(72) Inventors: Shuai Wang, Beijing (CN); Jun Qing Xie, Beijing (CN); Xiaofeng Yu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/081,002

(22) PCT Filed: Mar. 10, 2016

(86) PCT No.: PCT/CN2016/076088
§ 371 (c)(1),
(2) Date: Aug. 29, 2018

(87) PCT Pub. No.: WO2017/152410
PCT Pub. Date: Sep. 14, 2017

(65) Prior Publication Data
US 2019/0037413 A1 Jan. 31, 2019

(51) Int. Cl.
*H04W 16/18* (2009.01)
*H04W 48/16* (2009.01)
(Continued)

(52) U.S. Cl.
CPC .......... *H04W 16/18* (2013.01); *H04W 24/10* (2013.01); *H04W 48/16* (2013.01); *H04W 48/20* (2013.01)

(58) Field of Classification Search
CPC ..... H04W 16/18; H04W 24/10; H04W 48/16; H04W 48/20; H04W 48/18; H04W 24/02;
(Continued)

(56) References Cited

U.S. PATENT DOCUMENTS 9,059,802 B2 * 6/2015 Tipton ................... H04B 17/26
9,794,753 B1 * 10/2017 Stitt ...................... H04B 17/318
(Continued)

FOREIGN PATENT DOCUMENTS

| CN | 103037476 | 4/2013 |
| CN | 104038967 | 9/2014 |

(Continued)

OTHER PUBLICATIONS

International Searching Authority, The International Search Report and the Written Opinion, dated Dec. 14, 2016, PCT/CN2015/076088, 11 Pgs.
(Continued)

*Primary Examiner* — Nathan S Taylor
(74) *Attorney, Agent, or Firm* — Hewlett Packard Enterprise Patent Department

(57) ABSTRACT

Examples relate to predicting wireless access point availability. In one example, a computing device may: generate, for a wireless access point, a mapping for predicting availability of the wireless access point, the mapping specifying: one or more in-range cellular towers to which at least one client device has been connected while the at least one client device was also connected to the wireless access point; one or more border cellular towers to which at least one client device has been connected to i) subsequent to being connected to one of the one or more in-range cellular towers, and ii) while not connected to the wireless access point; and one or more out-of-range cellular towers to which at least one client device has been connected to i) subsequent to
(Continued)

being connected to one of the one or more border cellular lowers, and ii) while not connected to the wireless access point.

14 Claims, 7 Drawing Sheets

(51) Int. Cl.
*H04W 48/20* (2009.01)
*H04W 24/10* (2009.01)

(58) Field of Classification Search
CPC ............. H04W 24/08; H04W 28/0236; H04W 28/0273; H04W 28/0289; H04W 28/08; H04W 36/14; H04W 48/04; H04W 64/003; H04W 80/06; H04W 88/18; H04L 41/0896; H04L 47/225; H04L 47/27
USPC ............................... 455/418, 434, 436, 456.1
See application file for complete search history.

(56) References Cited

U.S. PATENT DOCUMENTS

| | | | | |
|---|---|---|---|---|
| 9,807,552 | B1* | 10/2017 | Singhal | H04W 4/02 |
| 2007/0021126 | A1* | 1/2007 | Nanda | H04W 48/16 |
| | | | | 455/456.1 |
| 2008/0137626 | A1 | 6/2008 | Choi et al. | |
| 2010/0248715 | A1 | 9/2010 | Lundsgaard et al. | |
| 2010/0291930 | A1* | 11/2010 | Xie | H04W 36/14 |
| | | | | 455/436 |
| 2011/0310866 | A1* | 12/2011 | Kennedy | H04W 16/14 |
| | | | | 370/338 |
| 2012/0155385 | A1 | 6/2012 | Bencheikh | |
| 2013/0143542 | A1* | 6/2013 | Kovvali | H04W 48/18 |
| | | | | 455/418 |
| 2013/0208700 | A1 | 8/2013 | Lim et al. | |
| 2013/0208713 | A1* | 8/2013 | Hamade | H04W 48/18 |
| | | | | 370/338 |
| 2014/0095071 | A1 | 4/2014 | Srikanteswara et al. | |
| 2014/0105003 | A1* | 4/2014 | Austin | H04W 4/02 |
| | | | | 370/229 |
| 2014/0199994 | A1* | 7/2014 | Richards | H04W 24/10 |
| | | | | 455/426.1 |
| 2014/0287751 | A1* | 9/2014 | Lee | H04W 48/16 |
| | | | | 455/434 |
| 2014/0351880 | A1* | 11/2014 | Low | H04L 63/20 |
| | | | | 726/1 |
| 2015/0208226 | A1 | 7/2015 | Kuusilinna et al. | |
| 2015/0319677 | A1 | 11/2015 | Colban et al. | |
| 2016/0338145 | A1* | 11/2016 | Bhanage | H04W 52/0245 |

FOREIGN PATENT DOCUMENTS

| | | |
|---|---|---|
| CN | 104937975 | 9/2015 |
| WO | WO-2014096954 A2 | 6/2014 |

OTHER PUBLICATIONS

Zhou, X. et al., "Practical Conflict Graphs for Dynamic Spectrum Distribution," (Research Paper), ACM SIGMETRICS Performance Evaluation Review, Jun. 17-21, 2013, 12 pages, available at http://www.cs.ucsb.edu/~gangw/conflict-sigmetrics13.pdf.

Yun Won Chung, "Reducing Signaling Load of Power-Efficient Integrated WLAN/Cellular Networks", IEICE Electron. Exp., vol. 7, No. 9, 2010, pp. 652-658.

* cited by examiner

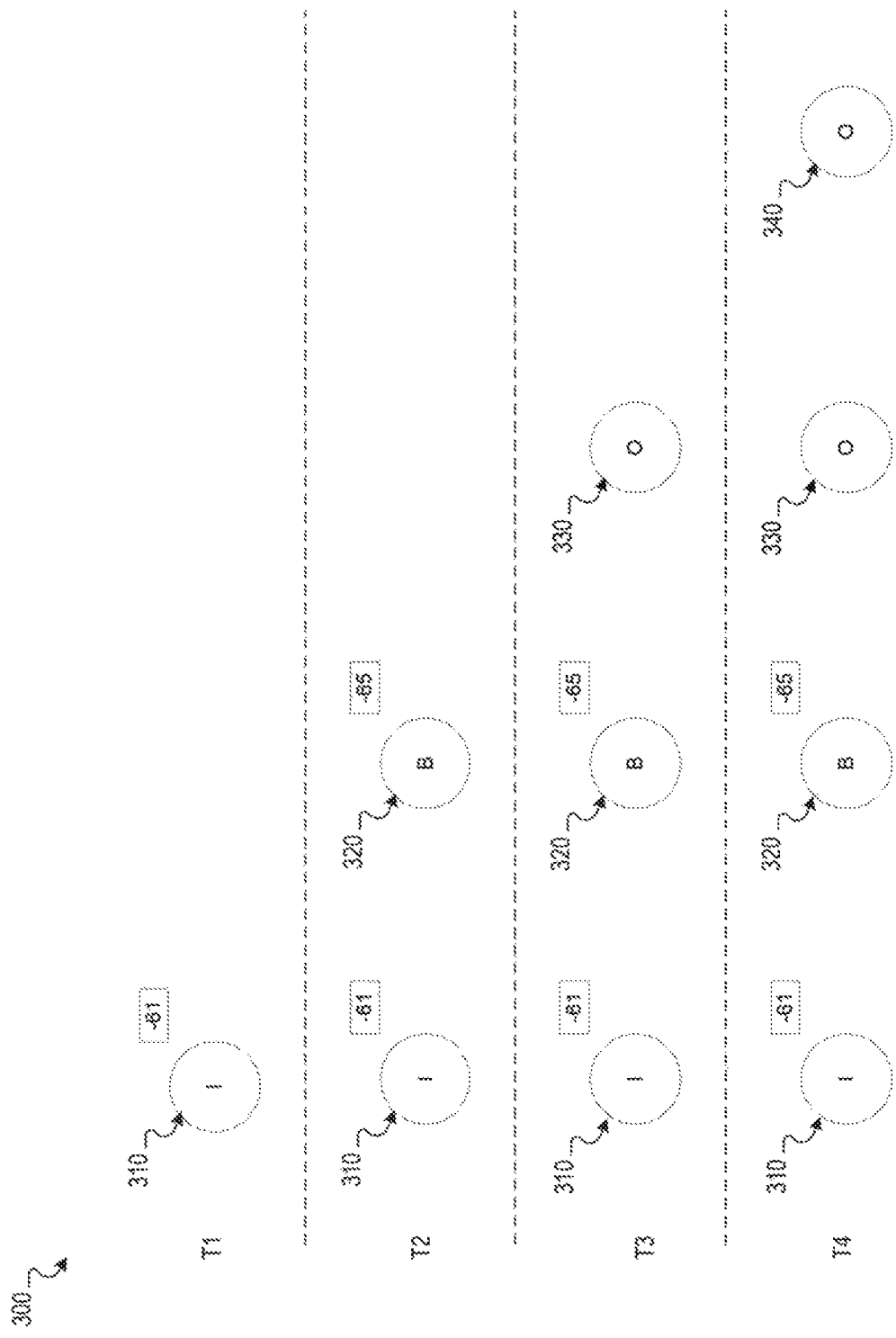

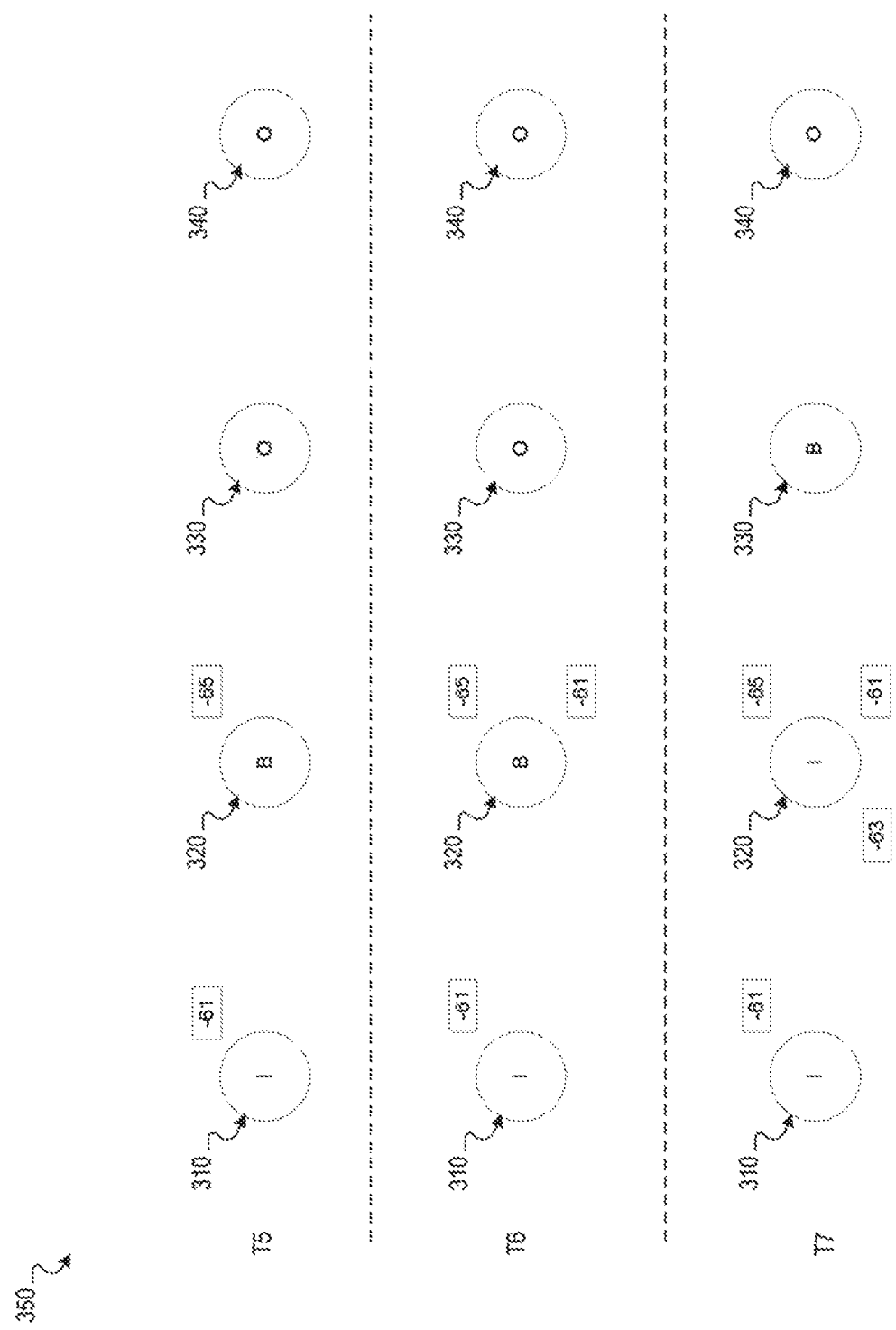

PREDICTING WIRELESS ACCESS POINT AVAILABILITY

BACKGROUND

Cellular network communications devices, such as cellular phones and cellular network access points, transmit data across cellular networks. While bandwidth for transmitting data across cellular networks is limited, some cellular network communications devices are capable of transferring data across other networks, such as broadband or satellite networks.

BRIEF DESCRIPTION OF THE DRAWINGS

The following detailed description references the drawings, wherein:

FIGS. 3A and 3B depict an example illustrations of a mapping used to predict wireless access point availability.

DETAILED DESCRIPTION

Figure 1:
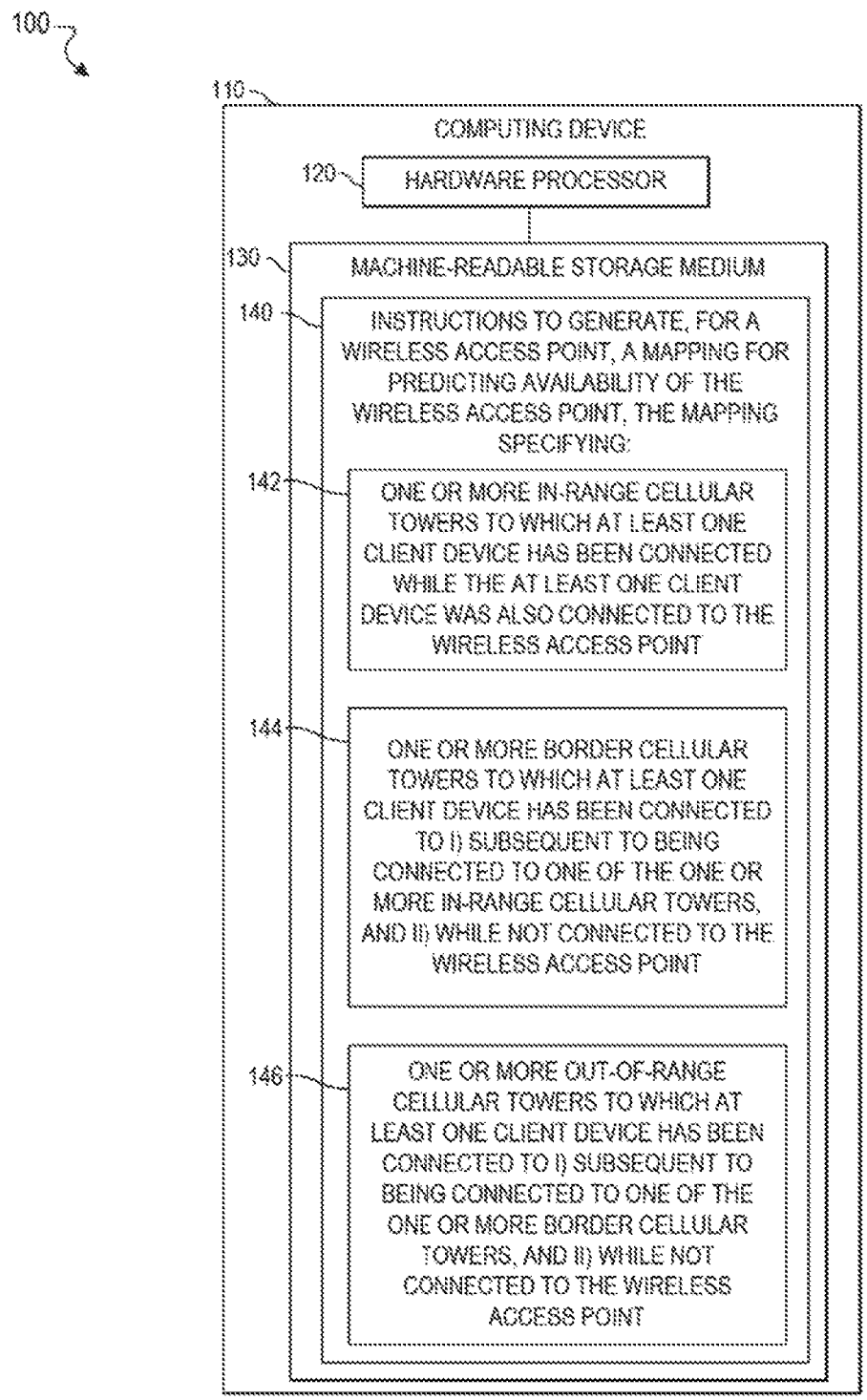
FIG. 1 is a block diagram of an example computing device for predicting wireless access point availability.

Cellular network communications devices, or cellular devices, may use mobile data offloading (MDO) techniques to avoid using cellular networks to transmit data. For example, a cell phone may connect to a broadband network using an included Wi-Fi radio in communication with a Wi-Fi access point, offloading the transmission of data to the broadband network. Offloading the transmission of data to a non-cellular network may have many advantages. For example, use of MDO may increase available cellular network bandwidth and, in some situations, increase the speed and/or reliability of data transmission for individual devices. For users who have network provider enforced limits on cellular data transmission, data offloading may allow those users' devices to transmit data across networks that do not contribute to the users' cellular data limit.

For some MDO methods, cellular devices use Wi-Fi radios to scan for and connect to available Wi-Fi access points that are connected to non-cellular networks. However, using a Wi-Fi radio requires power, and frequent use of a Wi-Fi radio to search for access points may drain a device's battery, and connecting or attempting to connect to an access point with relatively low signal strength may result In relatively slow data transmission and/or data loss, leading to a poor user experience. Predicting wireless access point availability allows a cellular network communications device to predict when a Wi-Fi access point may be within range of the device. This allows the device to leave its Wi-Fi radio off until an access point is predicted to be within range, preserving the device's battery and increasing the likelihood of performing a successful handoff.

As used herein, "access point" (AP) refers to any access point to a network that Is separate from the cellular network on which a cellular device is operating. For example, the access point may be a Wi-Fi router connected to a broadband or satellite network, or—in some implementations—a cellular hotspot connected to a cellular network that is separate from the cellular network on which the cellular device is operating. Cellular devices may communicate with access points in a variety of ways, including Wi-Fi, Wi-Fi Direct, and Bluetooth, to name a few.

By way of example, a wireless availability prediction device may predict when a wireless access point is available using signal strength measurements, e.g., measured in decibel-milliwatts (dBm), from a cellular tower, or cell, and data that maps cells to access points. The data used to make the prediction, e.g., a mapping or graph, may be created by periodically taking received signal strength indicator (RSSI) measurements from cells and selectively determining, using the Wi-Fi radio of a device, whether the wireless access point is available. The selective gathering of data used in a mapping or graph may be performed in a manner designed to build a relatively reliable graph without requiring the Wi-Fi radio to be on for an extended period of time. When describing "predictions," the in some implementations the prediction results may be based on a measure of likelihood of success, while in other implementations the prediction is based on factors unrelated to likelihood of success, e.g., time-based or geo-location triggers may be used to ensure connection attempts are made, regardless of the actual likelihood of success. This type of predicting may be done, for example, when generating a mapping used for making future predictions. Further details regarding the collection of data used to create a mapping or graph, and the prediction of wireless access point availability, are described in the paragraphs that follow.

Referring now to the drawings, FIG. 1 is a block diagram 100 of an example computing device 110 for predicting wireless access point availability. Computing device 110 may be, for example, a cellular device, such as a cell phone, a personal computer, a server computer, or any other similar electronic device capable of cellular communications or communicating with cellular devices, in the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 140, to control processes for predicting wireless access point availability. As an alternative or in addition to retrieving and executing instructions, hardware processor 120 may include one or more electronic circuits that include electronic components for performing the functionality of one or more instructions.

A machine-readable storage medium, such as 130, may be any electronic, magnetic, optical, or other physical storage device that contains or stores executable instructions. Thus, machine-readable storage medium 130 may be, for example, Random Access Memory (RAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions; 140, for predicting wireless access point availability, As shown in FIG. 1, the hardware processor 120 executes instructions 140 to generate, for a wireless access point, a mapping for predicting availability of the wireless access point. The mapping is a representation of data, which may take a variety of forms, e.g., the mapping may be a graph, table, or database. As noted above, the wireless access point may be any access point to a network that is separate from the cellular network on which a cellular device is operating, e.g., a Wi-Fi router for a broadband or satellite network.

The mapping specifies (142) one or more in-range cellular towers to which at least one client device has been connected while the at least one client device was also connected to the wireless access point. For example, in situations where the computing device 100 is a cellular phone, the phone may, when connected to the wireless access point, record an identifier for a cell to which the phone is also connected. The cellular may be specified, in the mapping, as an in-range cellular tower because the phone was connected to the cellular tower while It was in range of the access point. In some implementations, for each in-range cellular tower, the mapping also specifies at least one RSSI that was measured by one of the client devices that was connected to both the cellular tower and the access point. The mapping may include multiple RSSI measurements from the same client device or, in some implementations, RSSI measurements from different client devices.

The mapping also specifies (144) one or more border cellular towers to which at least one client device has been connected to i) subsequent to being connected to one of the in-range cellular towers, and ii) while not connected to the wireless access point. For example, in a situation where the computing device 100 is a cellular phone, border cellular towers may be towers that the phone connected to immediately following an in-range cellular tower. The border cellular towers may be specified as such based on the relative connection sequence, e.g., following an in-range tower, and also based on there being no successful connection to the wireless access point. In some implementations, for each border cellular tower, the mapping also specifies at least one RSSI that was measured by one of the client devices that was connected to the border cellular tower while not connected to the wireless access point. The mapping may include multiple RSSI measurements from the same client device or, in some implementations, RSSI measurements from different client devices.

The mapping further specifies (146) one or more out-of-range cellular towers to which at least one client device has been connected to i) subsequent to being connected to one of the border cellular towers, and ii) while not connected to the wireless access point. For example, in a situation where the computing device 100 is a cellular phone, out-of-range cellular towers may be towers that the phone connected to immediately following a border cellular tower or another out-of-range cellular tower. As with border cellular towers, out-of-range cellular towers may be specified as such based on the relative connection sequence, e.g., following a border cellular tower or another out-of-range cellular tower, and also based on there being no successful connection to the wireless access point.

The mapping described above may be generated for an access point in a variety of ways. In some implementations, the computing device 100 causes a wireless access point communications radio of the computing device 100 to attempt to establish communications with the wireless access point. The computing device may also 100 obtain an identifier for a cellular tower to which the device is connected. In response to determining that the identified cellular tower is not included in the mapping, the computing device 100 may add it to the mapping. Whether the cellular tower is added to the mapping as an in-range, border, or out-of-range tower depends on the results of the attempt to establish communications with the wireless access point and the type of cellular tower the device was previously connected to. For example, in response to the device successfully connecting to the access point, the identified cellular tower may be added to the mapping as an in-range cellular tower. As another example, in response to the device not being able to connect to the access point, the identified cellular tower may be added to the mapping as i) a border tower if the tower that preceded the identified cellular tower was an in-range tower, or ii) an out-of-range tower if the tower that preceded the identified cellular tower was a border tower or another out-of-range tower.

In some implementations, when adding a cellular tower to the mapping that was not previously specified by the mapping, the computing device 100 may obtain an RSSI for the cellular tower and associate the RSSI with the cellular tower in the mapping. The computing device 100 may also store, in the mapping, an indicator for the RSSI, the indicator specifying whether the connection to the wireless access point was successful. For example, when the mapping is implemented in a graph, each cellular tower may be represented by a node, and each RSSI measurement for each cellular tower may be represented by a sub-node for the cellular tower nodes. The RSSI sub-nodes may be associated with data that indicates whether the attempt to connect to a wireless access point was successful.

In some situations, cellular towers to which the computing device 100 is connected may already be specified by the mapping. In this situation, the computing device may update the mapping based on RSSI measurements and results of attempted connections to a wireless access point. In some implementations, in response to determining that the computing device 100 is connected to an out-of-range tower, the computing device 100 may turn or leave off a wireless communications radio and forego attempting to connect to the wireless access point. In some implementations, in situations where the connected cellular tower is a border tower, the computing device 100 may attempt to connect to the wireless access point. If successful, the computing device 100 may then change the border tower to an in-range tower in the mapping. In situations where the connected cellular tower is an in-range tower, the computing device 100 may also attempt to connect to the wireless access point. In some implementations, any time an attempt is made to connect to the wireless access point, an RSSI measurement for the connected cellular tower may be obtained and recorded in the mapping, along with an indication of whether the attempt was successful.

In some implementations, as noted above, a border tower may be changed to an in-range lower, e.g., if the computing device is able to connect to the wireless access point while connected to the border tower. In this situation, neighboring towers of the new in-range tower may be changed to border towers. A neighboring tower may be, for any given tower, a tower that a device was handed off to after previously being connected to the given tower.

While the examples above describe the generation of predicting wireless access point availability using a mapping for a single access point, in some implementations multiple mappings may be used for multiple access points, or a single mapping may be generated for multiple access points. For example, a user of the computing device 100 may select a number of wireless access points for the computing device 100 to predict availability of and to connect to using the techniques described above. By way of example, a single mapping implemented in a graph may have several in-range nodes for towers that are within range of a first wireless access point, and several other in-range nodes for towers that are within range of a second wireless access point. In addition, multiple wireless access points may, in some implementations, be treated as a single wireless access point. For example, a business entity may have many wireless routers placed throughout an area for connecting to the entity's wireless network. Some or all of the entity's wireless routers may be considered a single access point in a mapping used to predict wireless access point availability.

While the examples above describe the generation of a mapping and predicting wireless availability using a cellular phone, other types of computing devices may be used, and generation of the mapping may be performed in a distributed manner. For example, the computing device 100 may collect data from mobile computing devices, such as cell phones, and use the data obtained from the mobile computing devices to generate one or more mappings for predicting wireless availability. In some implementations, operations described as being performed by a single computing device 100 above may be performed by multiple devices, e.g., using a cellular phone to collect RSSI measurements and connection information and using a server computer to generate mappings using data provided by cellular devices.

Figure 2:
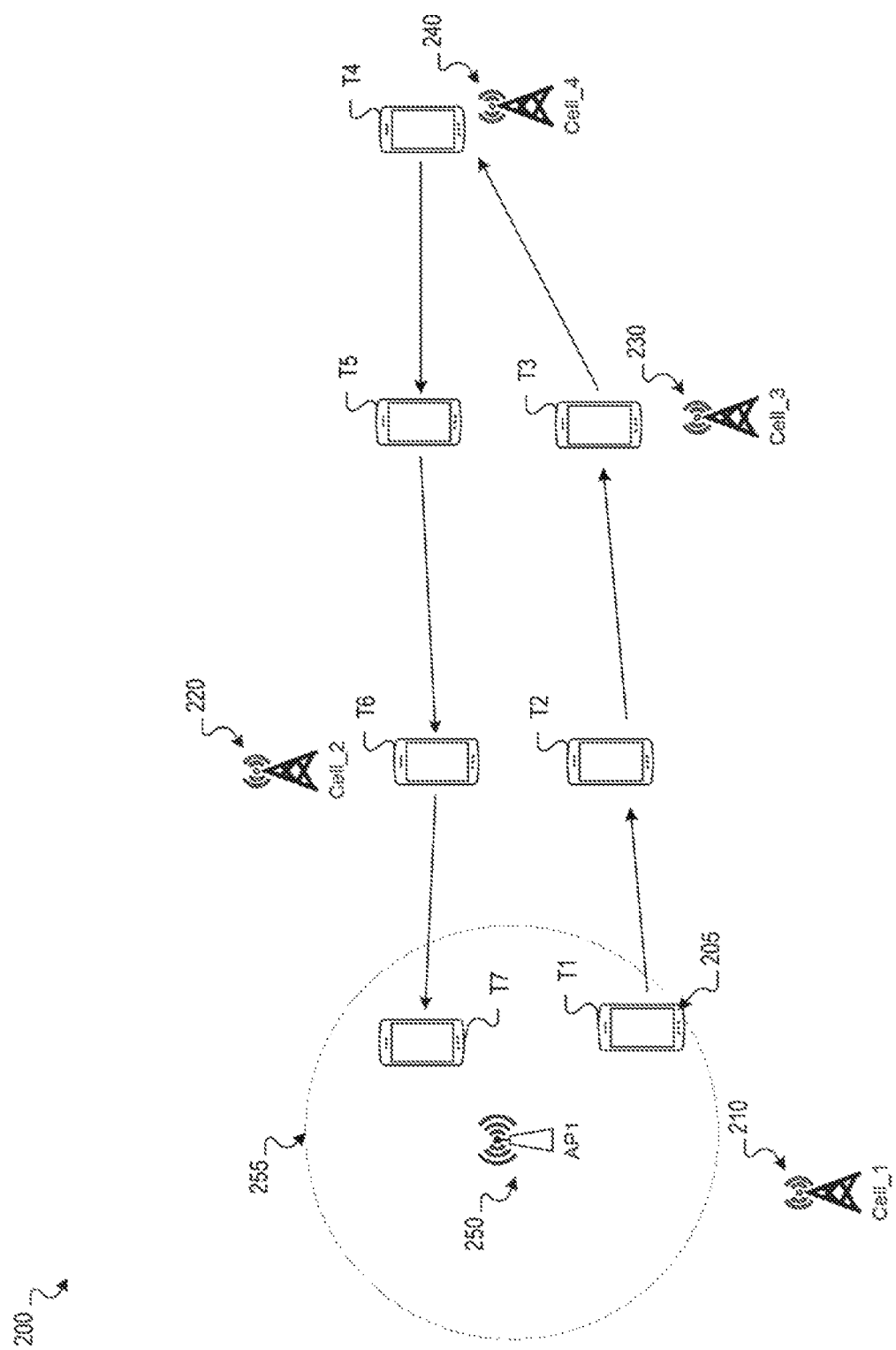
FIG. 2 is an example diagram depicting a computing device being used for predicting wireless access point availability.

FIG. 2 is an example diagram 200 depicting a computing device being used for predicting wireless access point availability. The diagram includes a mobile phone 205 as it changes locations over time, e.g., from time T1 through T7. As the phone 205 moves, it may change the cellular towers to which it is connected, e.g., Cell_1 210, Cell_2 220, Cell_3 230, and Cell_4 240. The diagram also includes a wireless access point AP1 250, to which the phone 205 may connect to, e.g., for offloading purposes. The access point AP1 250 has an example range indicated by the dotted circle 255.

To predict the availability of AP1, the phone 205 may build a mapping based on the towers to which the phone 205 is connected to and whether or not a connection to AP1 is available. By way of example, FIGS. 3A and 3B depict an example illustrations 300 and 350 of a mapping used to predict wireless access point availability for the access point AP1 250 of FIG. 2. In particular, the illustrations 300 and 350 depict the creation of an example graph over the times T1-T7 shown in FIG. 2.

For example, at time T1, the phone 205 is within range of AP1 250 and connected to the tower Cell_1 210, and a first node 310 of the graph is created. The first node 310 indicates that Cell_1 210 is an in-range tower using, in this example, the letter "I" for the node 310. At time T1, the phone 205 may also obtain the RSSI measurement for Cell_1 210, the tower to which the first node 310 corresponds, in the example illustration 300, the RSSI −61 is associated with the first node 310 and, in some implementations, stored with an indication that the RSSI −61 was associated with a successful attempt to connect to AP1 250.

The actions taking place at time T1 may be similar to the actions taken at time T2. At time T2, the phone 205 is no longer within range of AP1 250 and is connected to the tower Cell_2 220, and a second node 320 of the graph is created. The second node 320 indicates that Cell_2 220 is a border node using, in this example, the letter "B" for the node 320. At time T2, the phone 205 may also obtain the RSSI measurement for Cell_2 220, the tower to which the second node 320 corresponds. In the example illustration 300, the RSSI −65 is associated with the second node 320 and, in some implementations, stored with an indication that the RSSI −65 was associated with an unsuccessful attempt to connect to AP1 250.

At time T3, the phone 205 remains outside the range of AP1 250. The phone 205 may selectively determine whether to attempt a connection to AP1 250. In situations where the phone 205 first encounters a new cell tower, e.g., first encountering Cell_3 230 at time T3, the phone 205 may create a node, e.g., the third node 330 of the graph, and attempt to connect to AP1 250. The third node 330 indicates that Cell_3 230 is an out-of-range tower using, in this example, the letter "O" for the node 330. In the example graph, an RSSI is not gathered or associated with the third node 330. In some implementations, RSSI measurements may be taken for and associated with out-of-range nodes as well.

At time T4, the phone 205 remains outside the range of AP1 250 and connects to a new tower, Cell_4 240. The phone 205 creates a fourth node 340 for the graph and associates with an indicator specifying that the fourth node 340 represents an out-of-range tower.

At time T5, the phone 205 connects to Cell_3 230 again. In the example illustrations 300 and 350, there are no changes to the graph from T4 to T5. In the depicted implementation, for example, either no attempt to connect to AP1 250 is made or an RSSI for an unsuccessful attempt to connect to AP1 250 was not recorded. The third node 330 remains, at T5, a node representing an out-of-range tower, Cell_3 230.

At time T6, the phone 205 connects to Cell_2 for a second time. In the depicted implementation, the phone 205 attempts to connect to AP1 250 again, e.g., in response to the graph specifying Cell_2 as a border tower. The attempt at T6 is unsuccessful, and the RSSI −61 is added to the graph to indicate an RSSI measurement from which the access point AP1 250 was unavailable.

At time T7, the phone 205 is connected to Cell_2, and is within range of the access point AP1 250. At time T7, the phone 205 successfully connects to the access point AP1 250. In this situation, the second node 320 of the graph is updated with the RSSI measurement of −63, which is associated in the graph with an indication that at RSSI −63 a connection to AP1 250 was successful. In some implementations, as indicated in illustration 350, nodes of the graph may be updated or changed in response to the successful connection. For example, the second node 320 indicates, at time T7, that Cell_2 is now an in-range tower rather than a border tower. In addition, the third node 330 indicates that Cell_3 is now a border tower rather than an out-of-range tower.

In the example diagram 200, the phone 205 may determine when to check for access point availability based on the type of tower the phone is connected to at a given point in time. For example, the phone 205 may determine to check for wireless access point availability i) every time the phone 205 connects to a new tower not specified in the graph, ii) every time the phone 205 connects to a border tower or in-range tower, iii) periodically while the phone remains connected to a border tower, and iv) frequently while the phone remains connected to an in-range tower. In some implementations, RSSI measurements may be used to determine when a device attempts to connect to a wireless access point, e.g., if an RSSI measurement has already been associated, in a mapping, with an unsuccessful attempt for a particular tower, then the device may forego attempting to connect to the access point. Similarly, if an RSSI measurement hasn't been associated with any attempt to connect to an access point, or is associated with a successful attempt, the device may attempt to connect to the access point.

The manner in which a device, such as the phone 205, determines when to attempt a connection to an access point may vary. A device may, for example, check for access point availability at certain time intervals, for handoffs to in-range and/or border towers, and/or every n cellular tower handoffs, where n is a positive integer. As noted above, determining when to check for access point availability may also depend on RSSI measurements. Historical attempts to connect and/or statistics may also be taken into account when determining whether to attempt to connect to a wireless access point, e.g., a RSSI or tower with many recorded unsuccessful connection attempts may be less likely to result in an attempt to connect than an RSSI or tower with many recorded successful connection attempts. Combinations of the foregoing methods, including the use of user feedback, settings, and/or manual wireless radio activation, may be used to determine when a device checks for wireless access point availability.

The state of a wireless radio of a device, such as computing device 100 or phone 205, may vary. In some implementations, a wireless radio defaults to being turned off or disabled, e.g., to conserve battery, in this situation, the wireless radio is selectively enabled when building a mapping and/or when predicting wireless access point availability, e.g., in a manner similar to that described above for determining when to check for access point availability. Variations on the methods described above may be used for both generating a mapping and predicting of wireless access point availability.

Figure 4:
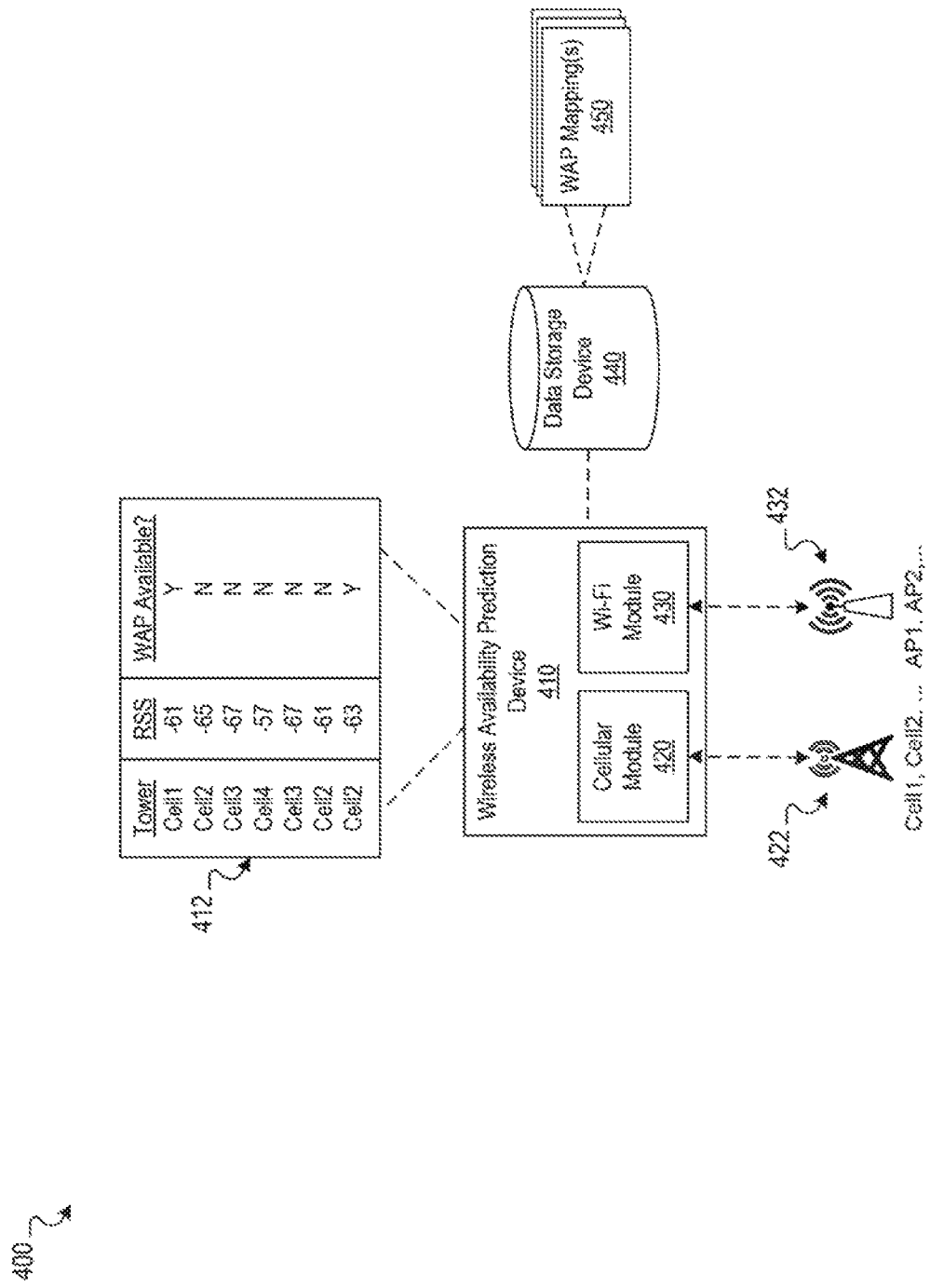
FIG. 4 is a data flow depicting an example wireless availability prediction device for predicting wireless access point availability.

FIG. 4 is a data flow 400 depicting an example wireless availability prediction device 410 for predicting wireless access point availability. The device 410 may be implemented, for example, in a cellular phone or other computing device supporting the features described above for predicting available access points, e.g., the computing device 100 of FIG. 1 and the cellular phone 205 of FIG. 2. The example prediction device 410 includes a cellular module 420 for communicating with and measuring RSSI of cellular towers 422 and a Wi-Fi module 430 for communicating with wireless access points 432. The modules, as used herein, may be comprised entirely of hardware or, in some implementations, a combination of hardware and instructions for performing various actions.

The prediction device 410 is also in communication with a data storage device 440, which may be used to store one or more wireless access point mapping(s) 450. Each mapping may be generated, e.g., by the prediction device 410, using features described above. For example, the data flow 400 depicts example data 412 gathered by the prediction device 410. This example data 412 corresponds to the measurements and wireless availability results described with respect to FIGS. 2 and 3 above. As indicated in the example data flow 400, multiple mappings may be generated by a prediction device. In some implementations, one mapping may be used for predicting availability of multiple access points. In this example implementation, the prediction device 410 may be capable of both generating mappings and using the mappings to predict wireless availability, e.g., using the methods and features described above.

Figure 5:
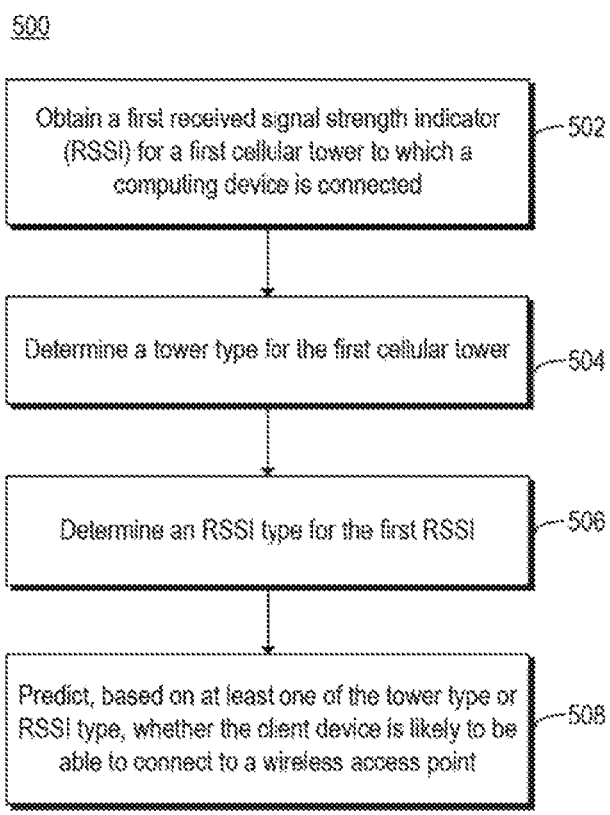
FIG. 5 is a flowchart of an example method for predicting wireless access point availability.

FIG. 5 is a flowchart of an example method 500 for predicting wireless access point availability. The method 500 may be performed by a computing device, such as a computing device described in FIG. 1, e.g., in the form of a cellular phone or server computer. Other computing devices may also be used to execute method 500. Method 500 may be implemented in the form of executable instructions stored on a machine-readable storage medium, such as the storage, medium 130, and/or in the form of electronic circuitry.

A first RSSI is obtained for a first cellular tower to which a computing device is connected (502). For example, a cellular phone may obtain an RSSI measurement from the cellular tower to which it is connected, A tower type is determined for the first cellular tower (504). The tower type may be an in-range tower, a border tower, or an out-of-range tower. An in-range tower indicates that at least one client device connected to a wireless AP while connected to the in-range tower. A border tower indicates that i) at least one client device connected to the border tower subsequent to being connected to an in-range tower, and ii) no client device was previously connected to the border tower while also connected to the wireless AP. An out-of-range tower indicates that i) at least one client device connected to the out-of-range tower subsequent to being connected to a border tower or another out-of-range tower, and ii) no client device was previously connected to the out-of-range tower while also connected to the wireless AP. The tower type may be determined, in some implementations, using a mapping. For example, a graph may specify cellular towers and their corresponding tower types.

An RSSI type is determined for the first RSSI (506). The RSSI type may include one of three types. A first RSSI type, e.g., a likely RSSI, indicates that at least one client device previously connected to the wireless AP while connected to the first cellular tower with the likely RSSI. A second RSSI type, e.g., an unlikely RSSI, indicates that at least one client device was previously unable to connect to the wireless AP while connected to the first cellular tower with the unlikely RSSI. A third RSSI type is a new RSSI that has not been previously recorded by a client device while connected to the first cellular tower. In some implementations, the RSSI types are determined using a mapping. For example, a graph may specify, using sub-nodes of a node that represents the first cellular tower, one or more RSSI measurements and their corresponding types.

Whether the client device is likely to be able to connect to the wireless AP is predicted based on the tower type and/or the RSSI type (508). For example, in some implementations, a device may predict that a connection to the wireless AP would be unsuccessful based on the tower type being out-of-range. A device may predict that a connection to the wireless AP would be successful based on the tower type being in-range or border. As another example, a device may predict an unsuccessful attempt to connect to the AP for an in-range or border tower based on the RSSI type being unlikely. The device may predict a successful attempt to connect to the AP for a border tower based on the RSSI being a new RSSI.

In some implementations, in response to predicting that the computing device is likely to be able to connect to the wireless AP, the computing device may activate a previously deactivated wireless AP communications radio and attempt to establish communications with the wireless AP. For example, a cell phone may activate its Wi-Fi radio and attempt to connect to a particular Wi-Fi AP. In response to predicting that the computing device is not likely to be able to connect to the wireless AP, a previously deactivated wireless AP communications radio may be left deactivated, e.g., In a manner designed to preserve cellular phone battery life by avoiding the use of the cellular phone's Wi-Fi radio.

In some implementations, the RSSI measurement used for prediction is a new RSSI. In situations where the computing device attempts to establish communications with the wireless AP, the new RSSI may be associated with the first cellular tower in a mapping for the first cellular tower. The mapping may further specify, for the new RSSI, whether the attempt to establish communications with the wireless AP was successful. For example, when the mapping is implemented using a graph, a new RSSI may be added, as a sub-node, to a node for the first cellular tower, and the sub-node may be associated with an indicator that indicates whether the attempted connection to the wireless AP was successful for that RSSI measurement while connected to the first cellular tower.

As noted above, in some implementations the computing device attempts to establish communications with the wireless AP when the computing device is connected to a border tower. In response to a successful connection to the wireless AP, the border cellular tower may be specified as an in-range cellular tower. In some implementations, changing a border tower to an in-range tower may also trigger a change each tower adjacent to the new in-range tower in the mapping. For example, after a border tower has been changed to an in-range tower, neighboring or adjacent towers may be changed to border towers. As indicated above, the change in tower type, from border to in-range or out-of-range to border, may affect future wireless availability predictions.

In some implementations and situations, other types of tower type transitions may also be used. For example, an out-of-range tower may be changed to an in-range tower in situations where a successful attempt to connect to the wireless AP occurs while a device is connected to the out-of-range tower. In implementations where multiple access points are included in a single mapping, adding or removing access points from the mapping may cause changes in tower types. For example, adding an access point may cause a change to any towers in range of the new access point as well as any towers that border the in-range towers. As another example, removing an access point from a mapping may cause formerly in-range and border towers to become border and/or out-of-range towers.

Figure 6:
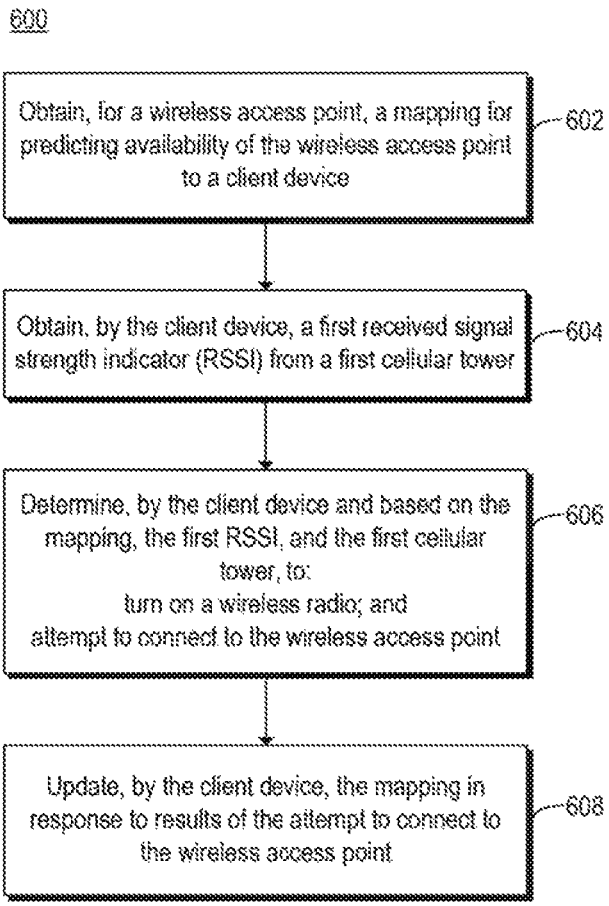
FIG. 6 is a flowchart of another example method for predicting wireless access point availability.

FIG. 6 is a flowchart of another example method 600 for predicting wireless access point availability. The method 600 may be performed by a computing device, such as a computing device described in FIG. 1, e.g., in the form of a cellular phone or server computer. Other computing devices may also be used to execute method 600. Method 600 may be implemented in the form of executable instructions stored on a machine-readable storage medium, such as the storage medium 130, and/or in the form of electronic circuitry.

A mapping for predicting availability of a wireless access point to a client device is obtained (602). For example, a cellular phone or server computer may obtain the mapping from a storage medium or from another device. As discussed above, the mapping may take on a variety of forms, such as a graph, databased, table, etc.

A first RSSI is obtained, by the client device, from a first cellular tower (604). For example, a cellular communications radio of a cellular phone may be used to measure the RSSI of the cell tower to which the phone is connected. A server device may, for example, obtain the first RSSI directly or from another device.

Based on the mapping, the first RSSI, and the first cellular tower, the client device determines to turn on a wireless radio and attempt to connect to the wireless access point (606). For example, a cell phone may determine to attempt to connect to the wireless AP based on identifying, in the mapping, the first cellular tower as an in-range tower or a border tower.

The client device updates the mapping in response to results of the attempt to connect to the wireless access point (608). For example, in situations where the attempt to connect to the wireless access point is successful and the first cellular tower is an in-range tower, the mapping may be updated by specifying the first RSSI as a likely RSSI for the first cellular tower, e.g., indicating success that may be used for future predictions. In situations where the attempt to connect to the wireless access point is successful and the first cellular tower is a border tower, the mapping may be updated by specifying the first cellular tower as an in-range tower and specifying the first RSSI as a likely RSSI for the first cellular tower. Other types of updates to the mapping may also be performed, e.g., specifying an RSSI as an unlikely RSSI for a particular cellular tower in response to unsuccessful AP connection attempts.

While the methods 500 and 600 are described with respect to a cellular device, other computing devices may also be used for some or all of the steps. For example, a server computer may generate a mapping and/or make a prediction regarding wireless availability and provide the cellular device with a mapping, prediction, or instructions to attempt to connect to an AP.

The foregoing disclosure describes a number of example implementations for predicting wireless access point availability. As detailed above, examples provide a mechanism for predicting and selectively determining when to activate a wireless radio to facilitate an MDO handoff.

The invention claimed is:

1. A non-transitory machine-readable storage medium encoded with instructions executable by a hardware processor of a computing device for predicting wireless access point availability, the machine-readable storage medium comprising instructions to cause the hardware processor to:
   generate, for a wireless access point, a mapping for predicting availability of the wireless access point, the mapping specifying:
      one or more in-range cellular towers to which at least one client device has been connected while the at least one client device was also connected to the wireless access point;
      one or more border cellular towers to which at least one client device has been connected to i) subsequent to being connected to one of the one or more in-range cellular towers, and ii) while not connected to the wireless access point; and
      one or more out-of-range cellular towers to which at least one client device has been connected to i) subsequent to being connected to one of the one or more border cellular towers, and ii) while not connected to the wireless access point.

2. The non-transitory machine-readable storage medium of claim 1, wherein the mapping further specifies:
   for each in-range cellular tower:
      at least one received signal strength indicator (RSSI) that was measured by a first client device while the first client device was also connected to the wireless access point; and
   for each border cellular tower:
      at least one RSSI that was measured by a second client device while the second client device was also not connected to the wireless access point.

3. The non-transitory machine-readable storage medium of claim 1, wherein the instructions, when executed, cause the hardware processor to add to the mapping each in-range cellular tower, border cellular tower, and out-of-range cellular tower by:

causing a wireless access point communications radio of the computing device to attempt to establish communications with the wireless access point;
obtaining an identifier for a cellular tower to which the computing device is connected; and
in response to determining that the cellular tower is not specified by the mapping:
specifying, in the mapping, the cellular tower as one of an in-range, border, or out-of-range cellular tower based on results of the attempt to establish communications with the wireless access point.

4. The non-transitory machine-readable storage medium of claim 3, wherein, in response to determining that the cellular tower is not specified by the mapping, the instructions further cause the hardware processor to:
obtain an RSSI for the cellular tower and associate, in the mapping, the RSSI with the cellular tower; and
store, in the mapping, an indicator for the obtained RSSI, the indicator specifying i) successful connection to the wireless access point, or ii) unsuccessful connection to the wireless access point.

5. The non-transitory machine-readable storage medium of claim 1, wherein the instructions, when executed, cause the hardware processor to:
obtain an identifier for a cellular tower to which the computing device is connected; and
determine that the cellular tower is specified, by the mapping, as a border cellular tower and, in response:
cause the computing device to enable a previously disabled wireless access point communications radio;
cause the wireless access point communications radio to attempt to establish communications with the wireless access point; and
specify, in the mapping, that the border cellular tower is an in-range tower in response to a successful attempt to connect to the wireless access point.

6. A computing device for predicting wireless access point availability, the computing device comprising:
a hardware processor; and
a data storage device storing instructions that, when executed by the hardware processor, cause the hardware processor to:
obtain a first received signal strength indicator (RSSI) for a first cellular tower to which the computing device is connected;
determine a tower type for the first cellular tower, the tower type including one of:
an in-range tower indicating that at least one client device connected to a wireless access point while connected to the in-range tower;
a border tower indicating that i) at least one client device connected to the border tower subsequent to being connected to an in-range tower, and ii) no client device was previously connected to the border tower while also connected to the wireless access point; or
an out-of-range tower indicating that i) at least one client device connected to the out-of-range tower subsequent to being connected to a border tower or another out-of-range tower, and ii) no client device was previously connected to the out-of-range tower while also connected to the wireless access point;
determine an RSSI type for the first RSSI, the RSSI type including one of:
a likely RSSI indicating that at least one client device previously connected to the wireless access point while connected to the first cellular tower with the likely RSSI;
an unlikely RSSI indicating that at least one client device was previously unable to connect to the wireless access point while connected to the first cellular tower with the unlikely RSSI; or
a new RSSI that has not been previously recorded by a client device while connected to the first cellular tower; and
predict, based on at least one of the tower type or RSSI type, whether the computing device is likely to be able to connect to the wireless access point.

7. The computing device of claim 6, wherein the instructions further cause the hardware processor to:
in response to predicting that the computing device is likely to be able to connect to the wireless access point:
cause the computing device to activate a previously deactivated wireless access point communications radio; and
cause the wireless access point communications radio to attempt to establish communications with the wireless access point; or
in response to predicting that the computing device is not likely to be able to connect to the wireless access point, leave a previously deactivated wireless access point communications radio deactivated.

8. The computing device of claim 6, wherein the computing device uses a mapping to:
determine the tower type for the first cellular tower; and
determine an RSSI type for the first RSSI.

9. The computing device of claim 8, wherein the instructions further cause the hardware processor to:
determine, based on the tower type, to cause the computing device to attempt to establish communications with the wireless access point; and
in response to determining that the first RSSI is a new RSSI:
associate, in the mapping, the new RSSI with the first cellular tower; and
specify, in the mapping and for the new RSSI, whether the attempt to establish communications with the wireless access point was successful.

10. The computing device of claim 8, wherein the instructions further cause the hardware processor to:
in response to determining that the first cellular tower is a border cellular tower, cause the computing device to attempt to establish communications with the wireless access point; and
in response to a successful connection to the wireless access point:
specify, in the mapping, that the border cellular tower is an in-range tower.

11. A method for predicting access point availability, implemented by a hardware processor, the method comprising:
obtaining, for a wireless access point, a mapping for predicting availability of a wireless access point to a client device;
obtaining, by the client device, a first received signal strength indicator (RSSI) from a first cellular tower;
determining, by the client device and based on the mapping, the first RSSI, and the first cellular tower, to:
turn on a wireless radio; and
attempt to connect to the wireless access point; and updating, by the client device, the mapping in response to a successful attempt to connect to the wireless access point by specifying the first RSSI as a likely RSSI for the first cellular tower.

12. The method of claim 11, further comprising:
identifying, based on the mapping, the first cellular tower as an in-range tower, the identification indicating that the client device previously successfully connected to the wireless access point while connected to the first cellular tower.

13. The method of claim 11, further comprising:
identifying, based on the mapping, the first cellular tower as a border tower, the identification indicating that i) the client device was connected to the border tower subsequent to being connected to an in-range tower, and ii) the client device was not previously connected to the border tower while also connected to the wireless access point.

14. The method of claim 13, wherein:
the attempt to connect to the wireless access point is successful, and
updating the mapping comprises:
   specifying the first cellular tower as an in-range cellular tower; and
   specifying the first RSSI as a likely RSSI for the first cellular tower.

* * * * *